United States Patent [19]

Bezdolny et al.

[11] Patent Number: 5,372,680
[45] Date of Patent: Dec. 13, 1994

[54] PLANT FOR PROCESSING VEGETAL STOCK

[75] Inventors: Nikolai I. Bezdolny, Krymokaya; Vladimir P. Kostylev, Krasnoyarsk, both of U.S.S.R.

[73] Assignee: Aktsionernoe obschestvo "Sistemy novykh tekhnology" (SINTO Ltd), Krasnoyarsk, Russian Federation

[21] Appl. No.: 30,196

[22] PCT Filed: May 30, 1991

[86] PCT No.: PCT/SU91/00105
§ 371 Date: Mar. 9, 1993
§ 102(e) Date: Mar. 9, 1993

[87] PCT Pub. No.: WO92/21739
PCT Pub. Date: Dec. 10, 1992

[51] Int. Cl.[5] ............................... B01D 3/00
[52] U.S. Cl. ................................ 202/83; 99/517; 202/197; 202/200; 202/202; 202/242; 203/92; 203/96
[58] Field of Search ................ 202/245, 83, 200, 242, 202/202, 197; 512/5; 203/96, 95, 92, DIG. 18; 99/486, 517, 646 R; 210/209

[56] References Cited

U.S. PATENT DOCUMENTS

| | | | |
|---|---|---|---|
| 2,106,200 | 1/1938 | Young et al. | 512/5 |
| 3,977,972 | 8/1976 | Bloch et al. | 210/220 |
| 4,629,534 | 12/1986 | Ezell | 202/153 |
| 4,666,559 | 5/1987 | Spindeler | 202/269 |
| 5,047,124 | 9/1991 | Haberland | 202/203 |
| 5,203,970 | 4/1993 | Ellis, Jr. | 202/203 |

FOREIGN PATENT DOCUMENTS

| | | |
|---|---|---|
| 2473058 | 9/1980 | France . |
| 2817963 | 11/1978 | Germany . |
| 29217 | 2/1933 | U.S.S.R. . |
| 1038268 | 8/1983 | U.S.S.R. . |
| 1409645 | 7/1988 | U.S.S.R. . |
| 1454830 | 1/1989 | U.S.S.R. . |

*Primary Examiner*—Virginia Manoharan
*Attorney, Agent, or Firm*—Collard & Roe

[57] ABSTRACT

A plant for processing vegetal stock includes a container mounted on a two-wheel trailer, and provided with bubblers for live steam which are arranged under a net for accommodation of the vegetal stock, and a detachable cover communicating through a steam pipe with a cooler which communicates with a separator through a distillate admission pipe provided with a splitter for preventing plug-shaped formation of oil therein. The bubblers for live steam are arranged in two planes perpendicular to the axis of the container and mounted in the cover is an additional bubbler.

16 Claims, 10 Drawing Sheets

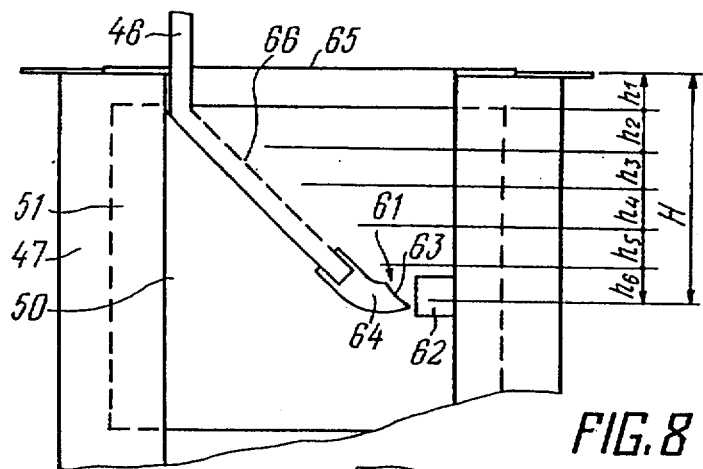
FIG. 8
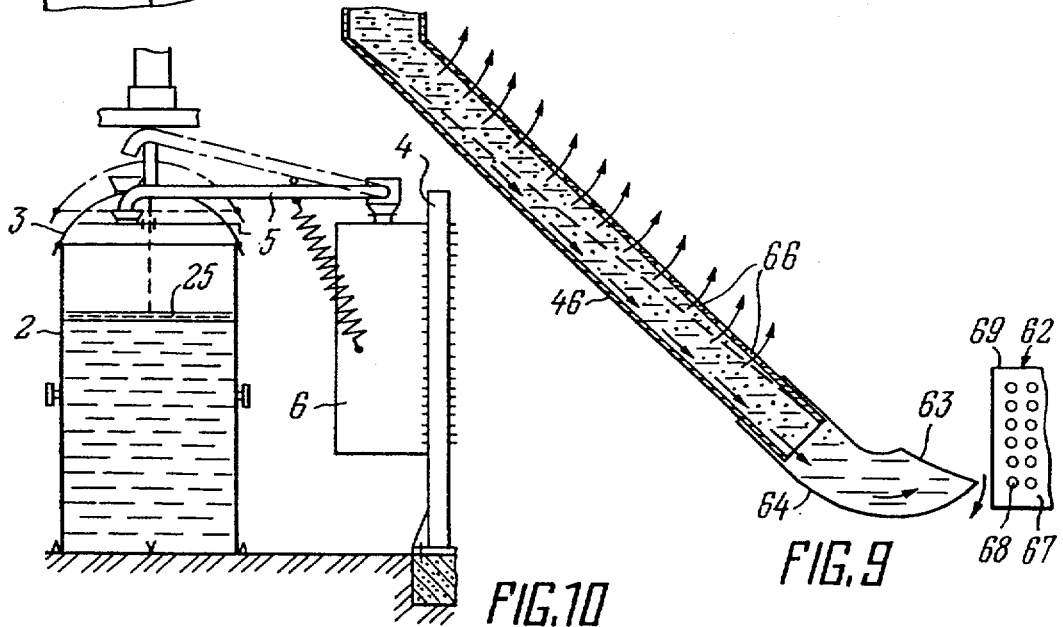
FIG. 9
FIG. 10

PLANT FOR PROCESSING VEGETAL STOCK

BACKGROUND OF THE INVENTION

1. Field of the Invention

The present invention relates to food industry, and, more particularly, to a plant for processing vegetal stock.

2. The Prior Art

Known in the art is a plant for processing vegetal stock comprising a container with bubblers for live steam mounted on a two-wheel trailer with a possibility of angular swivelling, the bubbler being positioned under a net placed wherein in the vegetal stock, which plant incorporates a detachable cover (Information Bulletin of the Crimean MTTSNTI, Issue 1, 1988, Simferopol, "Movable Device for Processing Essential Oil Herb and Flower Raw Material"). The cover is mounted on a vertical guide and communicates through a steam pipe with a cooler inlet chamber which accommodates a steam distributor adapted for distributing steam among a bundle of pipes mounted coaxially in the cooler housing, the cooler communicating through a distillate admission pipe with a separator, which communicates with a tank for collecting the finished product.

This plant is adapted for steaming out essential oil from vegetal stock. As compared to the other prior art plants for processing essential oil, herb and flower raw material, it features simple structure, low metal consumption, and requires less power. Due to the use of the trailer, the loading of the stock is performed directly in the field, which facilitates the yield of high-quality finished product, since the stock gets into the container without any contaminating substances. This plant helps dispense with complicated, costly equipment.

However, the structural arrangement of the container in this plant with the bubblers for live steam positioned under the net in one row fails to provide uniform distribution of the steam along the entire cross section of the container. Moreover, steam escapes from the bubblers' perforations with variable head in the beginning and the end. The live steam at a high pressure and temperature permeates the vegetal stock and causes decomposition of organic material, cellulose inclusive, the smell of the decomposition products impairing the quality of the essential oil obtained. Therefore, in the container of the structure described, it is not advisable to effect high-velocity steaming out of the oil at a high pressure inside the container and at the outlet therefrom. Besides, steam with essential oil, while getting onto the flow distributor in the cooler, is not uniformly distributed among the bundle of pipes dues to the fact that the distributor is shaped as a spherical perforated baffle, which results in considerable losses of essential oil carried away from the cooler outlet chamber by uncondensed steam. The obtained distillate with oil, passing through the admission pipe to the admission compartment of the separator, divides into two fractions, that is, water and oil, due to the difference in their specific weights. Due to the fact that in the separator utilized in the known plant, the pipe is arranged vertically, the heavy fractions of oil are suspended in the form of a lump which, having accumulated the critical mass, is thrown out as a plug from the pipe, and stirring and mixing the fluid in the settling compartment of the separator, agitates the fluid therein, whereby the oil emulsion is enthralled to a sewage system. All this causes reduction in the amount of the finished product and its quality, which renders the plant disadvantageous. In addition, the structural arrangement of the plant provides but a limited field of its utilization, for instance, to carry out extraction of essential oil and biologically active substances with liquid extracting agents, as is the case with the use of live steam, as well as with dead steam, which necessitates the provision of additional costly equipment of a limited use, whereby the cost and dimension of the plant grow.

SUMMARY OF THE INVENTION

It is an object of the present invention to provide a plant for processing vegetal stock having such a structural arrangement of its component parts that would ensure considerable stepping up of the plant capacity by virtue of enhancing the yield of the finished product which features improved quality characteristics, broadening of the range of the plant utilization attained by the possibility of carrying out the process of essential oil distillation using live or dead steam, the extraction of essential oils, food range dyes and biologically active substances being effected by liquid extractants.

Said object is achieved by a plant for processing vegetal stock comprising a container mounted on a two-wheel trailer with a possibility of angular swivelling and provided with bubblers for live steam positioned under a net placed whereon is the vegetal stock, and a detachable cover arranged on a vertical guide and communicating through a steam pipe with a cooler inlet chamber which accommodates a steam distributor for distributing the steam among a bundle of pipes arranged coaxially in the cooler housing communicating through a distillate admission pipe with a separator, which communicates with a receptacle for collecting the finished product, according to the invention, is provided with an additional bubbler positioned in the cover, whereas the bubblers mounted in the container are arranged in two parallel planes perpendicular to the container longitudinal axis, and the distillate admission pipe from the cooler to the separator is provided with a means for preventing plug-shaped formation of oil therein.

Advantageously, the bubbler mounted in the container in the first plane on the side of the net which is adapted for accommodation of the vegetal stock, is made as a cross piece arranged coaxially in the container whose two coaxially arranged parts communicate with arcuate bubblers located in this plane and facing each other with their concave surfaces, each of said parts communicating with one of linear portions of a U-shaped bubbler, which portion communicates with a steam source, the bubbler being arranged in the other plane perpendicular to the container axis.

This structural arrangement ensures high-velocity processing of essential oils due to the steam pressure increase at the outlet from the bubbler perforation and inside the container at temperatures which preclude adverse effect onto the diffusion process of the essential oil with steam, and its quality. Moreover, it leads to steam saving by virtue of its rational distribution at the same pressure throughout the whole cross section area of the container and eliminates loss of oil with the condensate due to its concentration by evaporation in the distillation process.

It is necessary that the additional bubbler be shaped as a ring coaxially arranged in the cover and communicating through a distributor mounted outside the cover with a working fluid source and with a unit for the processing mode automatic control.

This structural arrangement allows the feed of various working fluids directly downwards along the container profile, which facilitates the technological process and extraction of the products obtained. Moreover, the additional bubbler helps prevent clogging of the cooler bundle of pipes and the distillate contamination with dust and the stock particles and renders it possible to effect control of the moisture content of the stock and its compaction downward along the container profile, as well as to control the distillation of the essential oil and its remaining content in the stock being processed.

Used as a working fluid may be steam. Steam serves to moisten dry stock in the upper part of the container during the initial stage of the plant operation so as to prevent dust and light fractions from being enthralled with steam to the steam pipe. Apart from that, steam is used as a working fluid for enhancing moisture content of dry stock downward, along the profile, to a specified limit, ensuring optimum diffusion of steam and essential oil, as well as effective compaction of the stock downward along the profile, by virtue of enhancing its mass, which is attained by saturation of the stock with moisture. Steam is also used for a continuous process of extraction of food range dye of a vegetable origin by virtue of converting it into distilled water at a small rate.

To preclude clogging of the cooler with dust and light fractions and contamination of the distillate, as well as for extracting food range dyes by recirculation of the fluid in the stock extracted wherefrom is the required product, used as a working fluid is water.

To adjust the density of the condensate which ensures complete distillation of the essential oil, as well as to prevent development of microbiological processes in the container, used advantageously as a working fluid is a brine solution.

When extracting biologically active substances, for example, provitamin "A" by the flow technique, it is advisable to use oil as a working fluid.

In the extraction process of oil from crops for which the method of hydraulic distillation is not effective, it is reasonable to use alcohol as a working fluid.

Preferably, an additional net is installed in the cover under the additional bubbler, adapted for the interaction with the vegetal stock and arranged with a possibility of reciprocating coaxially in the container.

The additional net prevents throw-out of the upper layers of the vegetable oil toward the cooler, serves as a compaction pressing means of the entire surface of the stock throughout the whole process of the distillation, facilitates complete steaming out of the oil from the vegetable stock. Moreover, it helps reduce the steam rate required per unit of the oil obtained due to avoiding the formation of vertical drains steam passages, that is, by virtue of rational steam utilization.

When using dead steam in the distillation process of essential oil or for the extraction of essential oils and food grade dyes of vegetable origin, with the utilization of liquid extractants by way of infusion, it is necessary to provide the plant with an additional tank having a filtering metal gauze for accommodation of the vegetal, stock, coaxially mounted in the container with an annular gap.

It is expedient that the interior space of the additional tank under the filtering metal gauze accommodating the vegetal stock be in communication with a working fluid source through a branch pipe positioned in the container wall.

This embodiment ensures extraction by intensive circulation of the extractant both, under the conditions of heating the stock by dead steam, and without the heating.

To ensure complete condensation of the steam due to its rational distribution among all the pipes in the bundle, and, as a consequence, to eliminate the oil leakages with uncondensed steam, it is expedient that the steam distributor in the cooler be shaped as a vane rotor loosely mounted and positioned coaxially to the steam admission pipe, and the outlet chamber of the cooler be provided with a spherical baffle plate located at a distance from the bottom, the baffle plate facing with its convex surface the bundle of pipes.

It is expedient that the means for preventing the plug-shaped formation of oil in the distillate admission pipe to the separator be shaped as a splitter positioned in front of the outlet of said pipe installed in the admission compartment of the separator at an inclination and having a curvilinear portion in the area of the outlet, the convexity of the curvilinear portion facing the separator bottom and the passage area thereof increasing toward the outlet, whereas the surface facing the level of the fluid is provided with equidistantly spaced through holes.

This embodiment eliminates plug-shaped formation of oil due to the fact that the distillate is divided into fractions featuring different saturation with essential oil along the entire inclined portion of the pipe, the oil fractions having different specific weight emerging onto the surface in the settling compartment of the separator through the holes equidistantly spaced along the pipe surface, downward along the profile due to decelerated velocity of the distillate flow within the widened outlet portion of the pipe, as well as due to the flow of the heavy distillate downward and dissipation of the flow by the splitter.

To ensure complete damping of the flow velocity and the flow soothing which is essential for the separation of oil from water, the splitter should be made as a perforated plate folded at an angle with the corner edge positioned parallel to the level of the fluid in the separator.

It is reasonable to provide a spherical baffle plate with a perforation in the center thereof located under the vertical position dividing the separator housing into the admission compartment and the settling compartment, the baffle plate being mounted with an annular gap with respect to the inner surface of the housing and coaxially therewith, and facing with its convex surface the level of the fluid, and to install a cooling jacket on the whole internal surface of the housing under the spherical baffle plate, the jacket communicating with branch pipes for admission and disposal of a cooling agent, which are arranged in the planes perpendicular to the housing axis selectively along the planes.

This intensifies separation of water-soluble portion of the essential oil due to the fact that the low-temperature distillate exerts pressure onto the distillate fed, that is, by its high density and molecular bond within a limited contact area (the area of perforation).

Advantageously, the spherical baffle plate is made with double walls, provided with an additional wall arranged along its perimeter and facing the cooling jacket, and mounted on a spring-loaded rod positioned coaxially to the housing with a possibility of reciprocating, one end of the rod carrying a valve for closing the outlet opening for the sediment withdrawal, while the other end is arranged outside the housing and adapted for interaction with the sensor of electric signalling system.

This embodiment is versatile as it can function as a separator of the distillate, as well as an evaporator-extractor ensuring extraction and evaporation without free access of atmospheric oxygen.

Thus, the proposed plant for processing vegetal stock is versatile and capable of steaming out essential oils from vegetal stock using live and dead heating steam, to extract essential oils and food grade dyes of vegetable origin with the utilization of preservatives, such as, for example, brine solutions, liquid extractants, such as steam, water, oil, alcohol, without pressure or under the conditions of pressure inside the container. The plant of the invention ensures maximum rates of the steaming out process per time unit. It is mobile, not metal-consuming, does not require much power, meets the requirements of the design, labor protection and servicing conditions. Moreover, it is a high-capacity plant featuring remarkable separating characteristics of the oil separating device and modernized design of the water cooler. This is the first time that the bubblers are arranged also in the cover and an additional net is used as a compaction pressing means for the vegetal stock; besides, in the process flow diagram of the distillate separation, provision is made for technical solutions ensuring oil separation which dispenses with high labor consumption and many accessories.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views:

FIG. 8 is a fragmentary view along arrow A of FIG. 7;

FIG. 9 is an enlarged scale of the distillate admission pipe into the separator, according to the invention;

FIG. 10 shows the plant for processing vegetal stock according to the invention, at the moment of bringing down the additional net;

DETAILED DESCRIPTION OF PREFERRED EMBODIMENTS

Figure 1:
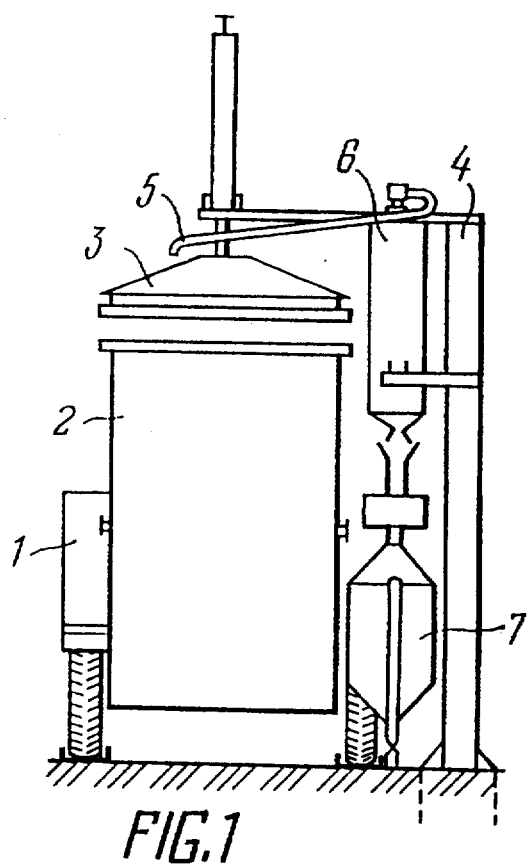
FIG. 1 is a schematic diagram of the plant for processing vegetal stock according to the invention.

The proposed plant for processing vegetal stock made according to the invention comprises a container 2 with a detachable cover 3 mounted on a two-wheel trailer 1 (FIG. 1) with a possibility of angular swivelling, the cover being positioned on a vertical guide 4 and communicating through a steam pipe 5 with a cooler 6, which communicates with a separator 7, which, in its turn, communicated with a receptacle (not shown) for collecting the finished product.

Figure 2:
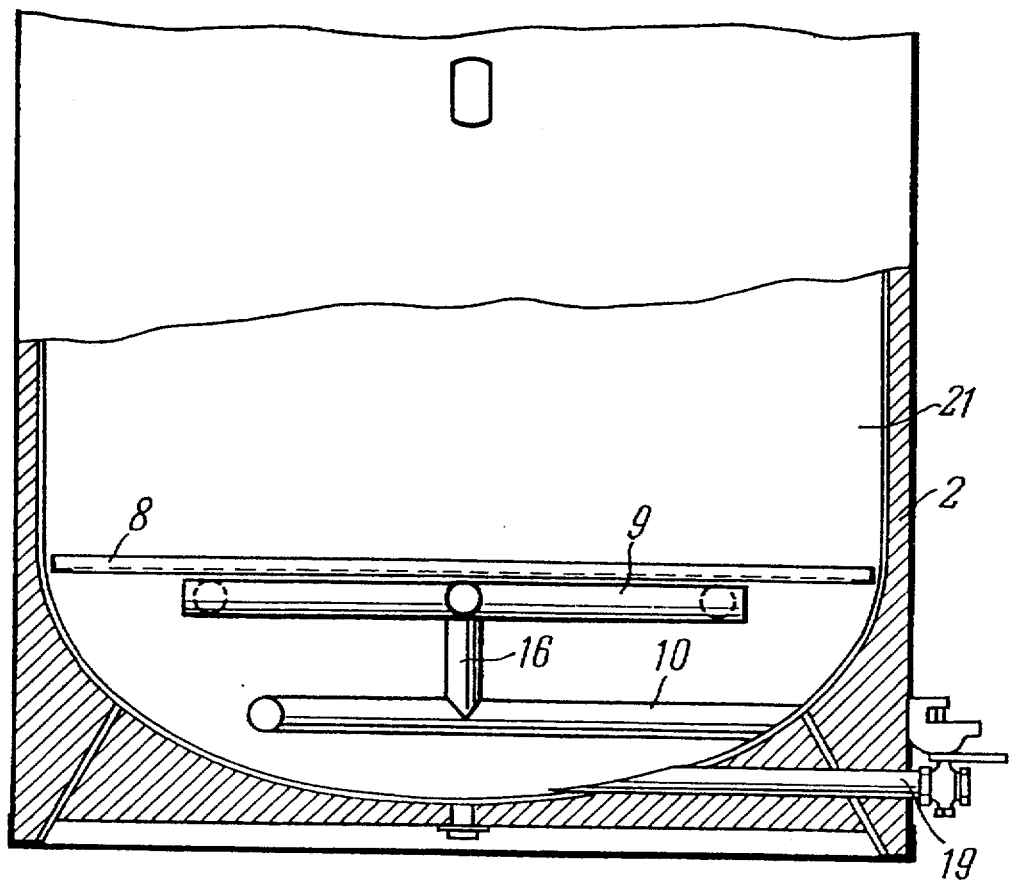
FIG. 2 is a longitudinal section of the container according to the invention.
Figure 3:
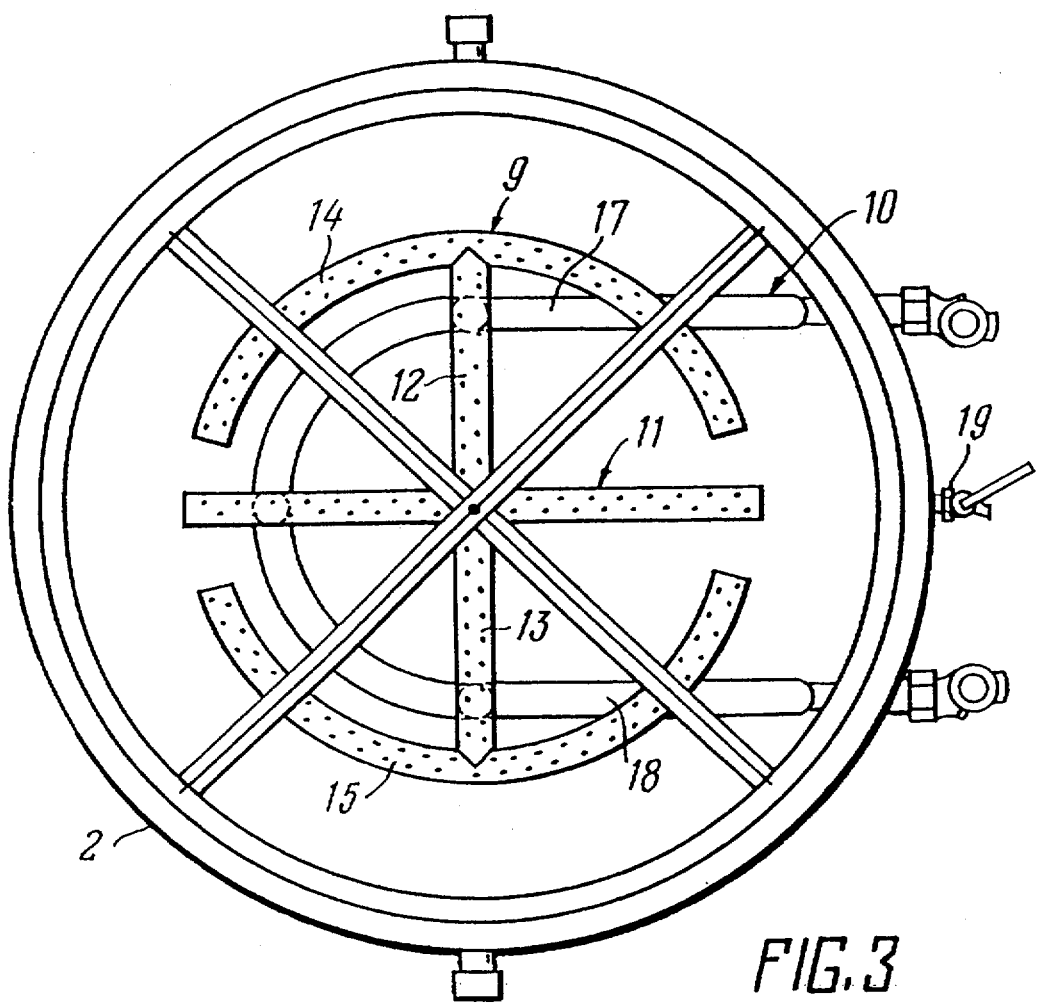
FIG. 3 is the same of FIG. 2, top view.

The container 2 (FIG. 2) is shaped as a cylinder and is provided with bubblers 9 and 10 positioned under a net 8 for accommodation of the vegetal stock in two parallel planes perpendicular to the axis of the container 2. The bubbler 9 mounted in the container 2 in the first plane on the side of the net 8 is shaped as a cross-piece 11 (FIG. 3) arranged in this plane coaxially to the container 2. Two coaxially located parts 12 and 13 of the cross piece 11 communicate with arcuate bubblers 14 and 15 in this plane and facing each other with their concave surfaces. Each part 12, 13 communicates through vertical branch pipes 16 (FIG. 2) with linear portions 17 and 18 (FIG. 3) of another bubbler 10 which is U-shaped. Each of the linear portions 17, 18 communicates with a steam source (not shown). From the side of the bottom the interior space of the container 2 communicates via a branch pipe 19 (FIG. 2) with a receptacle (not shown) for collecting the condensate.

Provided in the cover 3 (FIG. 4) coaxially thereto in the area of the outlet opening 20 through which the interior space 21 (FIG. 2) of the container 2 via the steam pipe 5 (FIG. 1) communicates with the cooler 6, in an additional bubbler 22 (FIG. 4) shaped as a ring (FIG. 5) and communicating via a distributor 22a with a source 23 (FIG. 4) of a working fluid and a processing mode automatic control unit 24, the distributor 22a being positioned outside the cover 3. Used as a working fluid are steam, water, oil, alcohol and brine solutions.

Arranged under the additional bubbler 22 in the cover 3 and adapted for interaction with the vegetal stock is an additional net 25 mounted with a possibility of coaxial reciprocating motion in the container 2 (FIG. 2), effected by a hand winch 26 whose control lever is detachably mounted on a shaft 28.

The cooler 6 (FIG. 6) comprises a cylinder-shaped housing 29 accommodating a bundle 32 of pipes secured on upper and lower separating plates 30 and 31, respectively. The upper separating plate 30 carries a steam distributor 33. Said distributor is essentially a vane rotor 37 positioned coaxially to a pipe 34 for admission of steam into an inlet chamber 35 and loosely set on a shaft 36. Mounted in an outlet chamber 38 of the cooler 6 coaxially therewith is a spherical baffle plate 39 facing with its convex surface the bundle 32 of pipes, the cooling agent being admitted to the bundle (32) through a branch pipe 40, and disposed therefrom through a branch pipe 41. The spherical baffle plate 39 is mounted on brackets 42 at a distance from the bottom of the housing 29 and defines a passage 43 communicating through a branch pipe 44 with a funnel 45 of a distillate admission pipe 46 into the separator 7 (FIG. 7) wherein the separation of light oil from water is based on the difference of their specific weights.

The separator 7 consists of a cylinder-shaped housing 47, an upper cone 48 and a lower cone 49 and a vertical partition 50, which divides the housing 47 into an admission compartment 51 and a settling compartment 52. The distillate admission pipe 46 is located in the admission compartment 51 and is secured to the upper cone 48 whose apex accommodates a branch pipe 53 with an expansion chamber 54 provided with a breather 55 and communicating with the receptacle (not shown) for collecting the finished product via a branch pipe 56. The lower cone 49 carries a branch pipe 57 with a discharge valve 58 secured thereto and adapted for withdrawal of the sediment, and a swan-neck pipe 59 connected thereto and provided with a discharge valve 60 for withdrawal of the distillate.

The distillate admission pipe 46 is mounted in the admission compartment 51 at an inclination and provided with a means 61 for prevention of plug-shaped formation of oil therein. Said means 61 (FIG. 8) is made as a splitter 62 positioned in front of the outlet 63 of said pipe 46, which pie has a curvilinear portion 64 (FIG. 9) within the area of the outlet opening 63 facing with its convexity the bottom of the separator 7 (FIG. 7) and having its passage area increasing toward the outlet 63 (FIG. 9), whereas the entire surface of the pipe 46 located in the admission compartment 51 (FIG. 8) and facing the level 65 of the fluid is provided with through holes 66 equidistantly spaced therein. The splitter 62 is essentially a plate 67 (FIG. 9) having a perforation 68 and folded at an angle with a corner edge 69 arranged parallel to the level 65 of the fluid.

The plant according to the invention operates as follows.

Prior to the processing of the vegetal stock of essential oil crops utilizing live steam, the cover 3 (FIG. 1) is placed down onto the container 2 and hermetically sealed. If the stock is dry, it is moistened. To this end, the working fluid is fed, that is, water from the source 23 through the additional bubbler 22 (FIG. 4) mounted in the cover. The moistening by the atomized water is carried out downwards along the profile throughout the entire height of the container 2 (FIG. 2) until water appears at the outlet from the pipe 19 for collecting the condensate.

This is necessary to provide optimum conditions for the diffusion process of the essential oil with steam. At a low moisture content of the stock and high temperature of the steam, diffusion is not effective.

Another reason for moistening is to wet dust and light fractions of the stock which can be enthralled by the steam flow, causing pollution of the distillate and clogging of the cooler 6 (FIG. 1).

One more reason is to enhance the density of the stock which is necessary for favorable conditions of the diffusion process.

Figure 4:
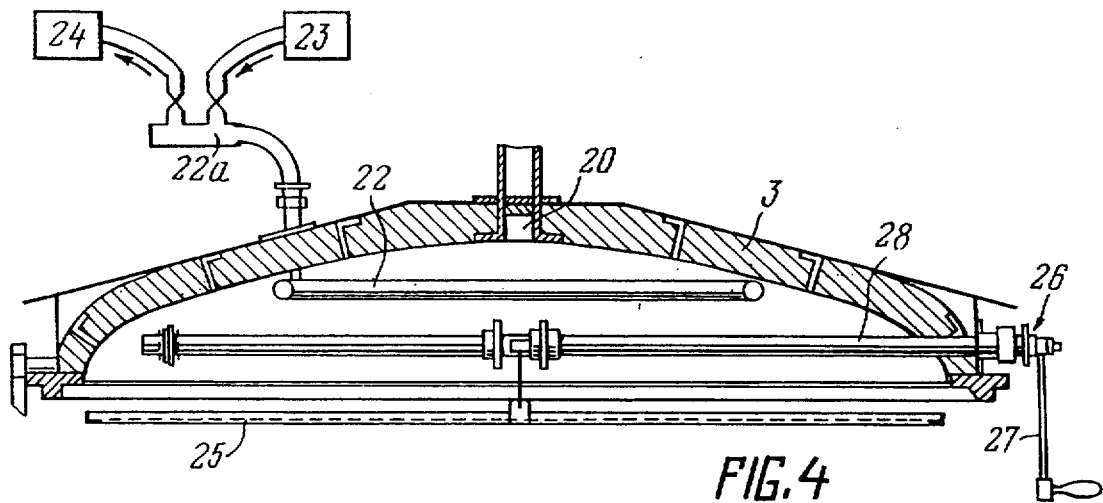
FIG. 4 is a longitudinal section of the container cover according to the invention.
Figure 5:
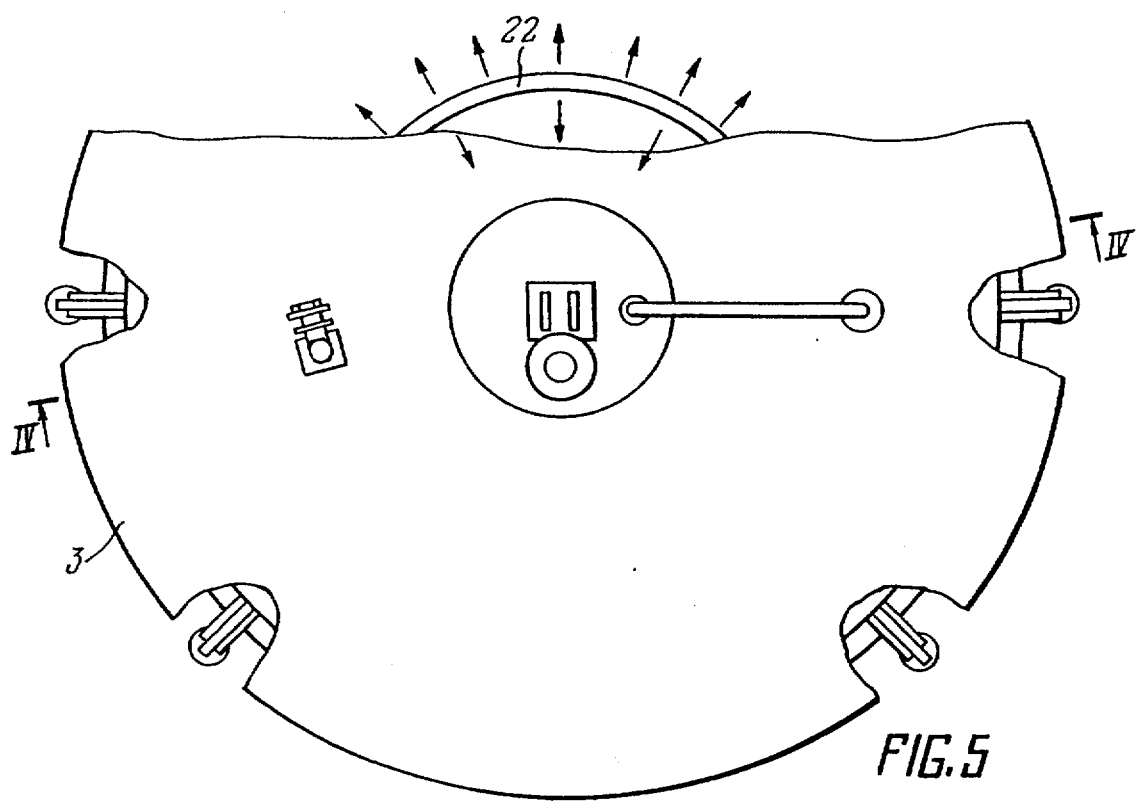
FIG. 5 is the same of FIG. 4, top view.

For the same reason use is also made of the additional net 25 (FIG. 10) mounted in the cover with the aid of the winch 26 (FIG. 4). To this end, before steam is fed to the container 2, a stop (not shown) is released and the additional net 25 falls down under gravity onto the surface of the stock.

Figure 6:
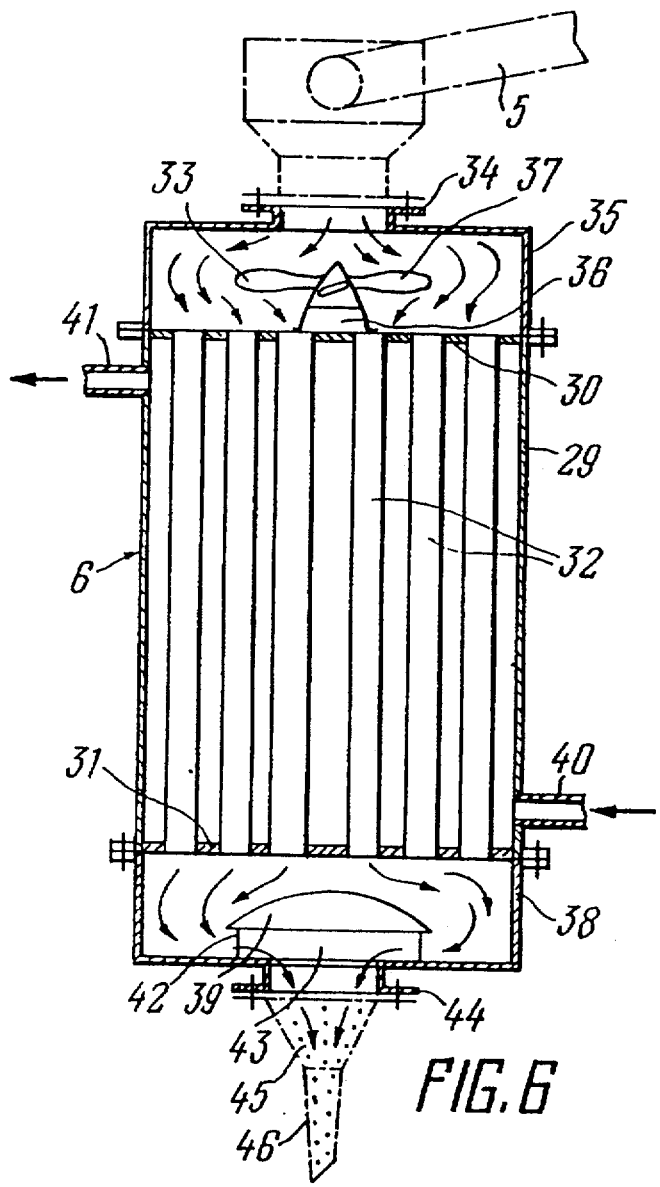
FIG. 6 is a longitudinal section of the cooler according to the invention.

After making certain that the stock is moistened, both linear portions 17, 18 (FIG. 3) of the U-shaped bubbler 10 are brought into communication with the steam source (not shown) and the steam is admitted. Steam, passing through the U-shaped bubbler 10 under high pressure, is forced out from the openings of the bubbler 9 and permeates the space between the stock throughout the whole cross section of the container 2, and the overheated steam with low moisture content getting in contract with the moisture with which the dry stock has been preliminary wetted, is converted into steam. Under the effect of temperature the surface and cell interstices of the essential oil are destroyed in the leaves. Oil in the gaseous phase contacts steam, whereby diffusion takes place and water steam carries oil to the upper part of the container 2, where it is admitted under pressure to the inlet chamber 35 of the cooler 6 through the outlet opening 20 (FIG. 4) in the cover 3 via the steam pipe 5 (FIG. 6). As the flow of steam contacts the vanes of rotor 37 and causes its rotation, the rotor vanes split and dissipate the steam flow, and thereby uniformly distribute it over the entire area of the upper separating plate 30, direct the steam to flow along the bundle 32 of pipes with identical head. The higher the pressure, the larger the rotation speed of the vane rotor 37 which, at any steam pressure at the outlet from the pipe 34 automatically provides uniform distribution of steam in the bundle 32 of pipes.

Figure 7:
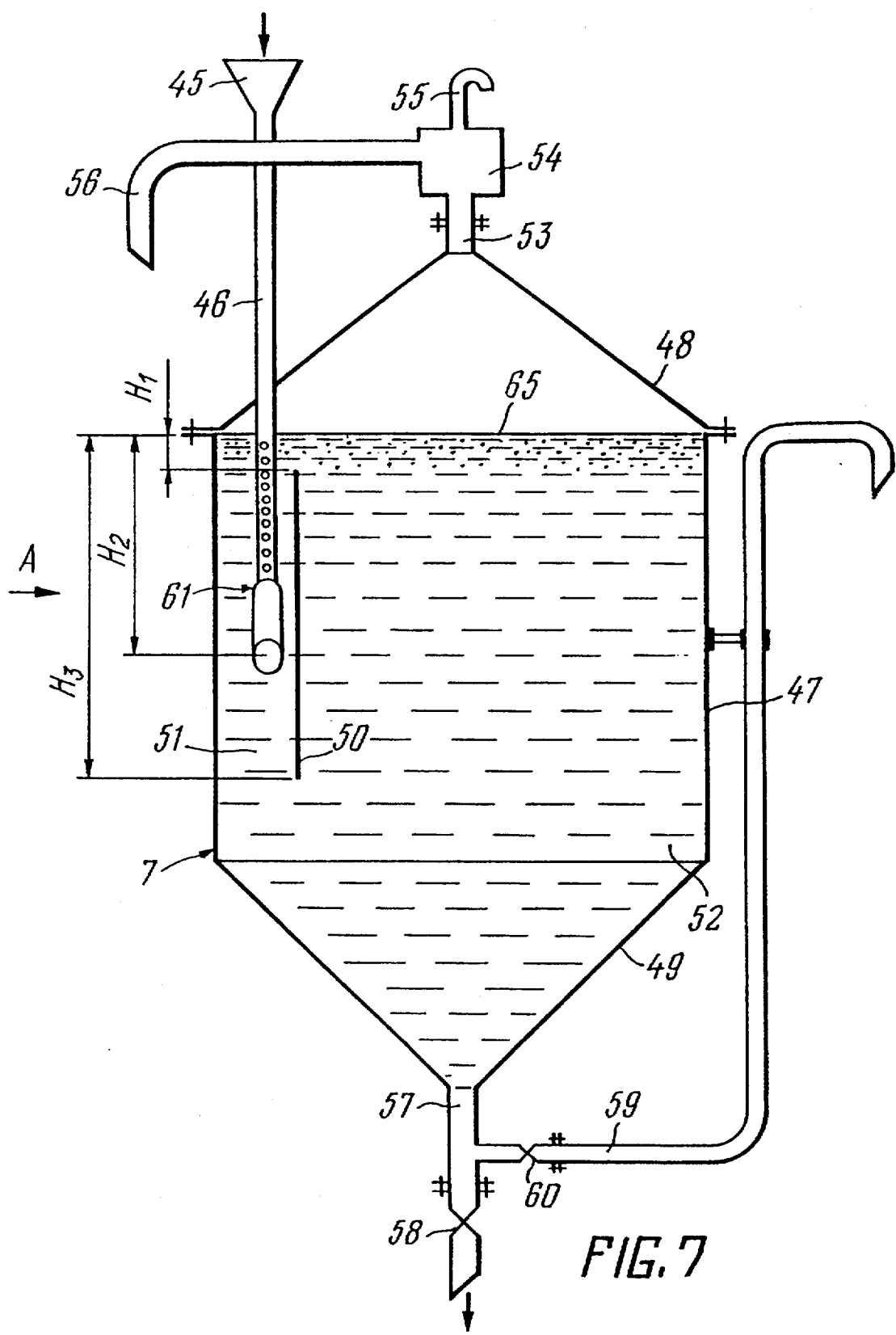
FIG. 7 is a longitudinal section of the separator according to the invention.

Simultaneously, a cooling agent (cooled water) is fed in a counter-current flow via the branch pipe 40 into the inter-pipe space of the housing 29 and removes heat from steam admitted through the pipes, and flows out through the branch pipe 41, whereas steam in the bundle 32 of pipes condenses and the distillate flows along the pipes to the outlet chamber 38 and, through the branch pipe 44, gets into the funnel 45 of the distillate admission pipe 46 of the separator 7 (FIG. 7). The remaining uncondensed steam passing through the bundle 32 of pipes (FIG. 6) also enters the outlet chamber 38 and, flowing round the cold spherical baffle plate 39, is directed to cold walls of the chamber 38, wherein it condenses and also flows in a liquid phase into the separator 7 (FIG. 7) along the passage 43 through the branch pipe 44.

Since the distillate admission pipe 46 is installed in the admission compartment 51 at an inclination, a primary separation of oil from the distillate takes place. In the course of this gradual separation on portions $h_1$ and $h_6$ (FIG. 8), in small quantities, oil emerges on the surface inside the pipe 46 through the holes 66 (FIG. 9) made therein and equidistantly spaced along its surface and flows into the distillate admission area. The separation of oil and its outflow through the holes 66 along the inclined portion of the pipe 46 takes place throughout its whole length. The saturation of the distillate with essential oil along the profile of the inclined portion of the pipe 46 is not identical, which is shown schematically in the figure. There is not enough time for the essential oil to be accumulated in the pipe 46 with the consequent formation of the plug, whereby the distillate freely flows through the outlet portion 64 whose cross section increases toward the outlet opening 63 and which is curvilinear in shape with the concavity facing the level 65 (FIG. 8) of the fluid. When the flow passes the portion 64 with the widened cross section it is decelerated and the distillate slowly flows through the outlet opening 63 (FIG. 9), wherein it is divided by the splitter 62, the perforation 68 whereof completely suppresses the distillate velocity. In the admission compartment 51 (FIG. 7) oil accumulates and flows over the vertical partition 50 into the settling compartment 52 and the distillate with a large specific weight is also admitted to the admission compartment 51, but under the vertical partition 50. As the distillate accumulates in the housing 47, a solid layer of oil covers the distillate. When oil reaches a level somewhat higher than the upper mark of the swan-neck pipe 59 with the valve 60 open and the valve 58 closed, the distillate having a low content of oil is discharged through the swan-neck pipe 59 to sewage collecting system. When it is required to discharge the collected oil, the discharge valve 60 of the swan-neck pipe 59 is closed. The level of the distillate in the upper cone 48 of the housing raises and oil through the pipe 53 is admitted to the expansion chamber 54 and, via the pipe 56, is directed to the receptacle (not shown) for collecting the finished product. Immediately after the first signs of water appearance, the oil discharge is discontinued, which is effected by opening the valve 60 of the swan-neck pipe 59. The provision of transparent walls in the distributing chamber 54 facilitates control of the oil disposed. The sediment is removed periodically through the pipe 57 with the valve 60 being closed and the valve 58 being open.

The structural arrangement of the separator described above helps enhance the separation of the essential oil from the distillate, compared to the prior art devices, by 12–15%. The structure is highly efficient for distillation of lavender or sage essential oils having definite specific weight and solubility in water.

Figure 11:
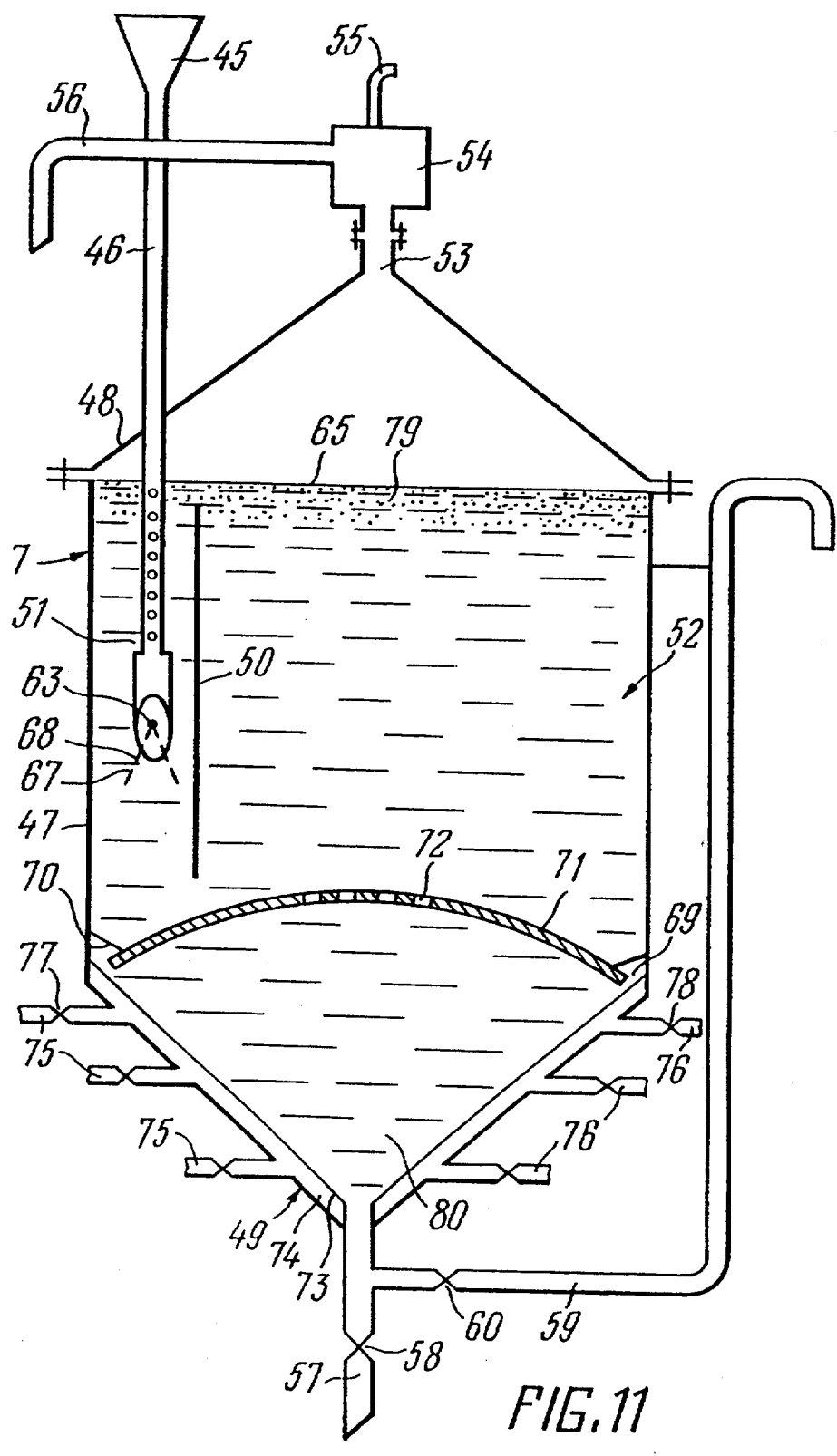
FIG. 11 shows the separator according to the invention utilizing the spherical baffle plate.

Separation of essential oils with different specific weights and solubility in water is based on the difference of the distillate temperature down along the profile of the separator 7 (FIG. 11). To this end, mounted in the separator 7 under the vertical partition 50 coaxially to the housing 47 and with an annular gap with respect to its inner surface on brackets 70, is a spherical baffle plate 71 with a perforation 72 in the center. The spherical baffle plate 71 faces with its convex surface the level 65 of the fluid, whereas the whole internal surface of the housing lower cone 49 under the spherical baffle plate 71 is provided with a cooling jacket 73. The interior space 74 of the jacket 73 communicates with the pipes 75, 76, respectively, for admission and disposal of the cooling agent. The pipes 75, 76 are arranged in parallel plane perpendicularly to the axis of the housing 47 and are provided with valves 77 and 78, respectively.

In this case, the distillate with unseparated heavy water soluble fractions of the essential oil flows down toward the spherical baffle plate 71, which divides the settling compartment 52 into an upper high-temperature chamber 79 and a lower low-temperature chamber 80.

The difference in temperatures is attained due to the fact that the cooling agent is fed into the cooling jacket 73 of the lower chamber 80, so as to maintain the distillate temperature in the lower chamber 80 within a preset range which is lower than the distillate temperature in the upper chamber 79. The distillate having the temperature exceeding 30° C. with low viscosity, while flowing down through the perforation 72 on the boundary with the area of a low temperature, comes in contact with the low-temperature distillate with high density and viscosity, fed to the lower chamber 80 through the annular gap 69, and is cooled, whereby the water molecules force out the essential oil molecules which emerge on the surface of the settling toward the location area of the separated essential oil.

Due to the fact that the additional bubbler 22 (FIG. 4) mounted in cover 3 communicates through distributor 22a with control unit 24, it is possible to obtain the necessary information and introduce modifications into the technological process.

Having the data of the volume of the vegetal stock in the container 2 (FIG. 1), the operation time of the cooler 6 in the process of steaming out, as well as the data of the oil yield per time unit, it is possible to calculate not only the oil remaining in the stock, but also the time when the process should be discontinued.

Of vital importance is a temporary preservation of the stock in container 2. This is attributed to the possibility that after the stock is charged into container 2, the processing operation is delayed by some reason, for instance lack of steam, any technical or technological failure of, for instance, the accessories or the trailer and its units, absence of operators involved, etc.

This brings about the development of the ensilage already after an hour and a half, in the container 2, that is, lactic fermentation or butyric fermentation, whereby the essential oil is completely decomposed and the stock acquires the smell of ensilage.

To prevent this phenomenon during prolonged periods of idle time of the stock in container 2 before the operation starts, provision is made for the possibility of preservation of the stock with preservatives, such as, for instance, the brine solution of NaCl. To this end, the brine solution with an assigned concentration is fed into the container 2 from the working fluid source 23 (FIG. 4) through perforations of the additional bubbler 22 in the cover 3. This impregnation with the brine solution down along the container profile eliminates the development of ensilage and caking, and ensures the stock preservation without loss of the essential oil for the time period from 2 to 6 hours.

There exists the possibility of a large loss of essential oil in the condensate due to the transition into water soluble fraction resulting from biological peculiarities of a crop, chemical and physical characteristics of the stock apart from the technological and maintenance reasons. In this case, with the view to effectively force out the essential oil from the condensate by enhancing its density and shifting its boiling point, fed into the area the bubblers 9, 10, through the additional bubbler 22 and the pipe 19 for discharging the condensate, is a brine solution in the amount sufficient for the U-shaped bubbler 10 to be submerged in the solution having the density which provides complete evaporation of the ethereal oil from the condensate.

Figure 12:
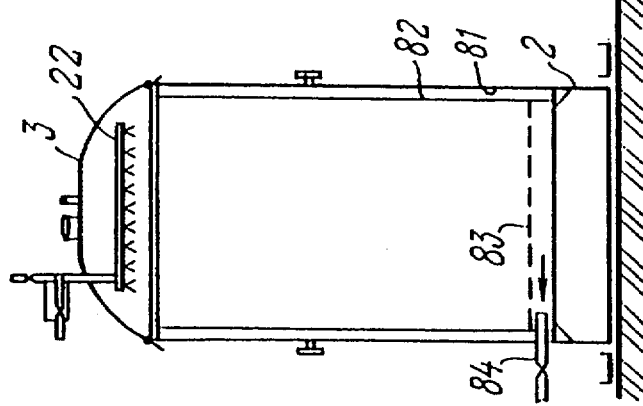
FIG. 12 shows the container with the additional tank according to the invention.

In the proposed plant made according to the invention, both live and dead steam can be utilized for the distillation process. To this end, an additional tank 82 is installed in the container 2 (FIG. 12) coaxially to an annular gap 81, which tank is secured on rests (not shown), instead of the net 8 (FIG. 2) for the vegetal stock. The additional tank 82 (FIG. 12) is provided with its own filtering metal gauze 83 for the vegetal stock.

Placed into the additional tank 82 are, for instance, essential oil rose buds. A natural brine is fed preservation of the rose petals. The container 2 is covered by a cover 3 and hermetically sealed. Fed into the bubbler 9, 10 (FIG. 4) is steam which, heating the bottom of the additional tank 82 (FIG. 12) from below and the outer walls, causes the stock in the tank 82 to boil. Vapors liberated from the boiling stock enthrall the essential oil via the steam pipe 5 (FIG. 1) to the cooler 6 and, further on, to the separator 7 provided with the spherical baffle plate 71 (FIG. 11) where the essential oil is separated as described above, whereas the remaining water-soluble oil with distillate flow to reservoirs (not shown) with activated charcoal where its adsorption takes place with the aid of the activated charcoal, whereupon the distillate is disposed to sewage system. The essential oil extraction from the activated charcoal is carried out by any known technological process.

The utilization of the additional tank 82 (FIG. 12) makes it possible to obtain food range dyes, such as, for example, Soflor dye. To this end, the interior space of the tank 82 under its filtering metal gauge 83 is brought in communication with a pump 85 (FIG. 13) via a pipe 84 provided in the wall of the container 2. In this case, after the cover 3 is hermetically sealed, wet steam is fed at a temperature of from 105° C. to 108° C. through the additional bubbler 22, the steam, spreading down along the profile and penetrating through the stock, condenses, thereby moistening the stock and dissolving the dye with distilled water (outlet 20 in cover 3 [FIG. 2] being closed). The distilled water saturated with the dye accumulates in the lower portion of the additional tank 82 (FIG. 13) and via pipe 84 flows to a receptacle (not shown). The extent of the distillate saturation is controlled visually and also by the fluid density which is done with the aid of an aerometer. The used stock is delivered to a waste disposal sewage system.

Figure 13:
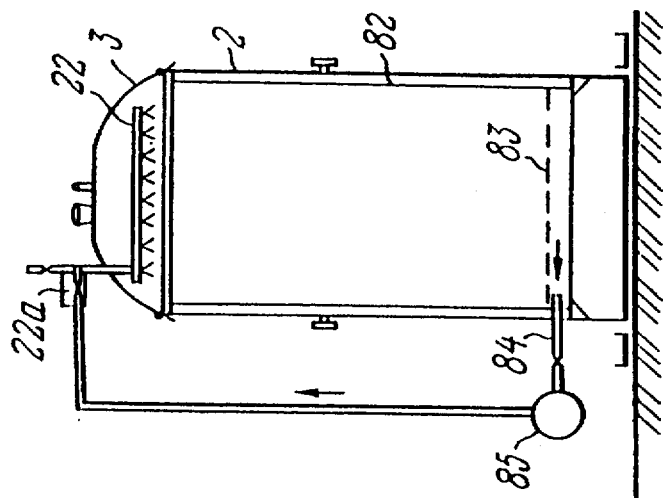
FIG. 13 is the same of FIG. 12, during repeated recirculation of the extractant in the stock.

When the extraction should be carried out at definite temperature conditions and without the access of free atmospheric oxygen, the stock in the additional tank 82 is submerged in the extractant fed through the additional bubbler 22 up to a preset level. The steam is preheated through the bubblers 9, 10 (FIG. 4) and the extractant is fused at a definite temperature without the access of air. This done, the extractant functioning as a solvent, is let out through the pipe 84 (FIG. 13).

When it is necessary to make the extraction process more intensive, repeated recirculation of the extractant in the stock is carried out. In so doing, definite rated temperature conditions are established in the additional tank 82, the pipe 84 via the pump 15, and the distributor 22 is brought in communication with the additional bubbler 22 and the liquid extractant in a closed loop is pumped over to its complete saturation with the essential oil, dye, vitamins and biologically active substances.

To obtain extracts featuring high concentration of active substances, for instance, muscatel sage with the density of 1.4 to 1.6, it is reasonable to perform evaporation without the access of the oxidant (atmospheric oxygen).

Figure 14:
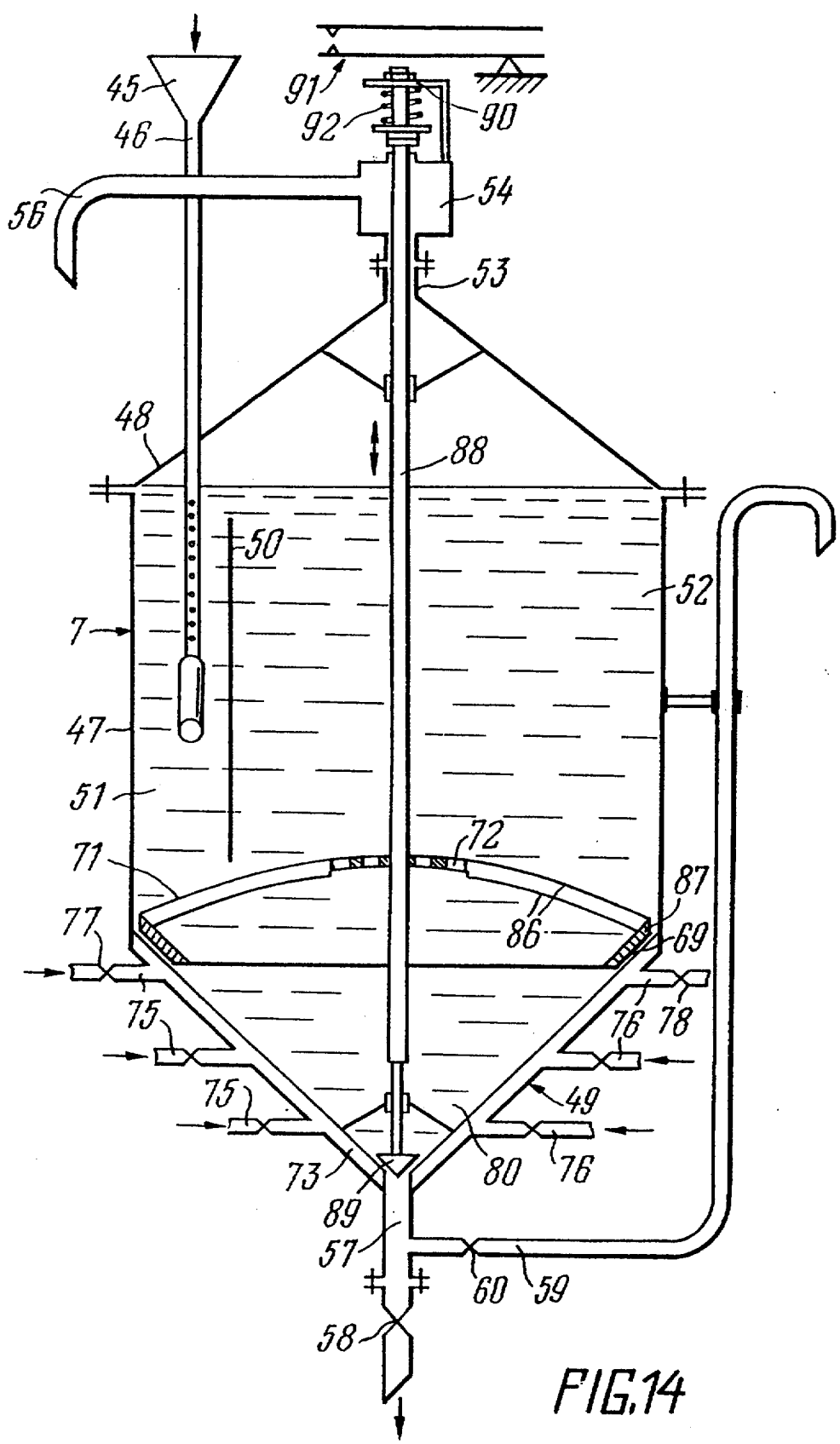
FIG. 14 shows the separator according to the invention provided with the movable spherical baffle plate.

To this end, the spherical baffle plate 71 in the separator 7 (FIG. 14) is made with double walls 86 and is provided with an additional cone-shaped wall 87 arranged along its perimeter and facing the cooling jacket 73. The spherical baffle plate 71 is positioned on a spring-loaded rod 88 arranged coaxially in the housing 47 for reciprocating therein. One end of the rod 88 mounts a valve 89 for closing the outlet opening of the pipe 57 for the sediment disposal, whereas the other end of the rod 88 arranged outside the housing 47 of the separator 7 interacts with a sensor 90 of the electric signalling system 91. The evaporation process is carried out as follows.

The separator 7 is filled with liquid extractant to a rated level. Steam is fed into the jacket 73 via the pipes 75. The extractant is brought to the boiling point in the lower chamber 80 under the spherical baffle plate 71. In the process of boiling, steam bursts violently out through the perforation 72 in the spherical baffle plate 71, preheating the extract bulk above it. As the extract concentration increases under the spherical baffle plate 71, pressure in the lower chamber 80 drops, and the next batch of the liquid extract is admitted through the perforation 72 into the chamber 80. As the boiling process increases, an excessive pressure is built up in the chamber 80 which cannot be brought to equilibrium due to clogging of the perforation 72 with the thick mass of the extract. In this case, the spherical baffle plate 17 with the walls 87 moves away from the surface of the lower cone 49 and raises upward, thereby causing the rod 88 to travel upward as well. The valve 89 in the lower chamber 80 opens the outlet opening of the pipe 57 and the condensate is disposed. As the rod 88 travels upward, the spherical baffle plate 71, moving upward, unseals the lower chamber 80, admitted whereunto is the next portion of the low-temperature liquid extract. The rod 88, while moving upward, interacts with the contacts of the sensor 90 which, through the electric signalling system 91, provides information about the automatic discharge of the evaporated sage, or about the fact that the temperature in the chamber 80 exceeds the rated value.

When the pressure under the spherical baffle plate reaches its equilibrium, the rod 88 under the action of a spring 92 brings it back to the initial position and the valve 89 closes the outlet opening of the pipe 57. The extract egress ceases and the liquid extract flows to the lower chamber 80 through the perforation 72 in the spherical baffle plate 71. The evaporation process will be continued till the next pressure build-up under the spherical baffle plate 71.

The present invention is most advantageously used for distillation of essential oils from vegetal stock using live and dead steam, for extracting with liquid extractants of essential oils, food range dyes, and biologically active substances, as well as for evaporation of the extracts with biologically active substances to a rated density.

While several embodiments of the present invention have been shown and described, it is to be understood that many changes and modifications may be made thereunto without departing from the spirit and scope of the invention as defined in the appended claims.

We claim:

1. An apparatus for processing vegetal stock comprising
   a container mounted on a two-wheel trailer, said container being provided with first and second bubblers for live steam positioned under a net for accommodation of the vegetal stock;
   a removable cover for said container arranged on a vertical guide and communicating through a steam pipe;
   a cooler having an inlet chamber receiving said steam pipe, wherein a steam distributor is mounted above a bundle of pipes arranged coaxially in a housing of the cooler;
   said cooler being connected through a distillate admission pipe with a separator communicating with a receptacle for collecting the finished product;
   an additional bubbler positioned in said cover, said first and second bubblers being mounted in the container and being arranged in two parallel planes perpendicular to a longitudinal axis of the container; and
   said distillate admission pipe from the cooler to the separator having means for preventing plug-shaped formation of oil therein.

2. An apparatus for processing vegetal stock comprising
- a container mounted on a two-wheel trailer, said container being provided with first and second bubblers for live steam positioned under a net for accommodation of the vegetal stock;
- a removable cover for said container arranged on a vertical guide and communicating through a steam pipe;
- a cooler having an inlet chamber receiving said steam pipe, wherein a steam distributor is mounted above a bundle of pipes arranged coaxially in a housing of the cooler;
- said cooler being connected through a distillate admission pipe with a separator communicating with a receptacle for collecting the finished product;
- an additional bubbler positioned in said cover, said first and second bubblers being mounted in the container and being arranged in two parallel planes perpendicular to a longitudinal axis of the container;
- said distillate admission pipe from the cooler to the separator having means for preventing plug-shaped formation of oil therein;
- said first bubbler being mounted in the container in a first plane on the side of the net for accommodation of the vegetal stock, said first bubbler comprising a cross-piece arranged coaxially in the container, said cross-piece having two coaxially arranged parts communicating with two arcuate bubblers having concave surfaces located in this plane and facing each other with their concave surfaces; and
- said second bubbler being a U-shaped bubbler and each of said coaxially arranged parts communicating with one of linear portions of said U-shaped bubbler, said linear portion communicating with a steam source, and said U-shaped bubbler being located in the other plane perpendicular to the longitudinal axis of the container.

3. An apparatus as claimed in claim 2,
wherein said additional bubbler is ring-shaped and mounted coaxially in the cover and communicating through a distributor positioned outside the cover with a working fluid source and with a unit for a processing mode automatic control.

4. An apparatus as claimed in claim 3, further comprising
a means for providing steam to be used as a working fluid.

5. An apparatus as claimed in claim 3, further comprising
a means for providing water to be used as a working fluid.

6. An apparatus as claimed in claim 3, further comprising
a means for providing a brine solution to be used as a working fluid.

7. An apparatus as claimed in claim 3, further comprising
a means for providing oil to be used as a working fluid.

8. An apparatus as claimed in claim 3, further comprising
a means for providing alcohol to be used as a working fluid.

9. An apparatus as claimed in claim 3, further comprising
an additional net provided in the cover under the additional bubbler for interaction with the vegetal stock, said additional net mounted for reciprocating coaxially in the container.

10. An apparatus as claimed in claim 3, further comprising
an additional tank which has a filtering metal gauge for accommodation of the vegetal stock, mounted coaxially in the container with an annular gap.

11. An apparatus as claimed in claim 10, wherein
the interior space of the additional tank under the filtering metal gauge for accommodation of the vegetal stock communicates with the working fluid source through a branch pipe positioned in the container wall.

12. An apparatus as claimed in claim 2,
wherein said steam distributor in the cooler comprises a vane rotor mounted on a shaft and positioned coaxially to a steam pipe; and
said outlet chamber of the cooler having a spherical baffle plate having a convex surface located at a distance from the bottom and facing with said convex surface the bundle of pipes.

13. An apparatus for processing vegetal stock comprising
- a container mounted on a two-wheel trailer, said container being provided with first and second bubblers for live steam positioned under a net for accommodation of the vegetal stock;
- a removable cover for said container arranged on a vertical guide and communicating through a steam pipe;
- a cooler having an inlet chamber receiving said steam pipe, wherein a steam distributor is mounted above a bundle of pipes arranged coaxially in a housing of the cooler;
- said cooler being connected through a distillate admission pipe with a separator communicating with a receptacle for collecting the finished product;
- an additional bubbler positioned in said cover, said first and second bubblers being mounted in the container and being arranged in two parallel planes perpendicular to a longitudinal axis of the container;
- said distillate admission pipe from the cooler to the separator having means for preventing plug-shaped formation of oil therein; and
- said means for preventing the plug-shaped formation of oil in the distillate admission pipe into the separator comprising a splitter positioned in front of an outlet opening of said pipe, mounted in the admission compartment of the separator at an inclination and having a convexity curvilinear portion in the area of the outlet opening, with the convexity facing the bottom of the separator and the passage thereof increasing toward the outlet opening, whereas the surface facing the level of the fluid is provided with equidistantly spaced through holes.

14. An apparatus as claimed in claim 13,
wherein the splitter is made as a perforated plate folded at an angle with the corner edge positioned parallel to the level of the fluid in the separator.

15. An apparatus as claimed in claim 13,
wherein a spherical baffle plate with a perforation in the center thereof is mounted under a vertical partition which divides the interior space of the housing of the separator into an admission compartment and a settling compartment, said baffle plate being positioned with an annular gap with respect to the inner surface of the housing and coaxially thereto, and facing with a convex surface the level of the fluid, whereas arranged on the whole internal surface of the housing under the spherical baffle plate is a cooling jacket communicating with pipes located in planes perpendicular to the housing longitudinal axis for admission and disposal of the cooling agent selectively along the planes.

16. An apparatus according to claim 15, wherein the spherical baffle plate is made with double walls, has an additional wall arranged along its perimeter and facing the cooling jacket, and is mounted on a spring-loaded rod arranged coaxially to the housing with reciprocating means, one end of the rod carrying a valve for closing the outlet opening for disposal of sediment, whereas the other end, which is located outside the housing, interacts with a sensor of an electric signalling system.

* * * * *